(12) United States Patent
Ahlgrimm et al.

(10) Patent No.: US 9,233,624 B2
(45) Date of Patent: Jan. 12, 2016

(54) METHOD AND DEVICE FOR ACTUATING AN ELECTRIC MACHINE IN THE MOTOR STARTING MODE

(71) Applicant: Robert Bosch GmbH, Stuttgart (DE)

(72) Inventors: Sven Ahlgrimm, Ludwigsburg (DE); Markus Peter, Zaberfeld (DE); Michael Menzel, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 306 days.

(21) Appl. No.: 13/649,173

(22) Filed: Oct. 11, 2012

(65) Prior Publication Data
US 2013/0093367 A1      Apr. 18, 2013

(30) Foreign Application Priority Data
Oct. 14, 2011   (DE) .......................... 10 2011 084 496

(51) Int. Cl.
| | |
|---|---|
| *H02P 1/00* | (2006.01) |
| *H02P 1/04* | (2006.01) |
| *B60L 15/20* | (2006.01) |
| *B60L 3/00* | (2006.01) |
| *B60L 11/18* | (2006.01) |

(52) U.S. Cl.
CPC ............... *B60L 15/20* (2013.01); *B60L 3/0038* (2013.01); *B60L 3/0061* (2013.01); *B60L 11/1803* (2013.01); *B60L 2240/36* (2013.01); *B60L 2240/421* (2013.01); *B60L 2240/423* (2013.01); *B60L 2240/425* (2013.01); *Y02T 10/642* (2013.01); *Y02T 10/7005* (2013.01); *Y02T 10/7275* (2013.01)

(58) Field of Classification Search
None
See application file for complete search history.

(56) References Cited

U.S. PATENT DOCUMENTS

| | | | | |
|---|---|---|---|---|
| 5,057,760 | A * | 10/1991 | Dadpey et al. ................. | 318/807 |
| 6,092,618 | A * | 7/2000 | Collier-Hallman ........... | 180/422 |
| 6,515,446 | B1 * | 2/2003 | Koide et al. .................... | 318/700 |
| 6,661,231 | B1 * | 12/2003 | Arai et al. ...................... | 324/426 |
| 7,602,138 | B2 * | 10/2009 | Kaneko et al. ................. | 318/806 |
| 7,852,053 | B2 * | 12/2010 | Martin et al. .................. | 323/272 |
| 8,629,643 | B2 * | 1/2014 | Tachibana et al. ............. | 318/696 |
| 2007/0159130 | A1 * | 7/2007 | Kaneko et al. ................. | 318/806 |
| 2010/0019508 | A1 * | 1/2010 | Hashimoto et al. ......... | 290/40 B |

* cited by examiner

*Primary Examiner* — Paul Ip
*Assistant Examiner* — Devon Joseph
(74) *Attorney, Agent, or Firm* — Michael Best & Friedrich LLP

(57) ABSTRACT

The present invention relates to a method (30) for actuating an electric machine (14) in the motor starting mode by means of a power electronic system (10), in particular for application in a motor vehicle, wherein the power electronic system (10) has a multiplicity of controllable power switches which are designed to supply the electric machine (14) with electric current (l_s), wherein a total amount of energy (50) which is required to reach a predefined rotational speed (n_crit) and a time period (t__0) for reaching the predefined rotational speed (n_crit) is estimated (38), wherein a setpoint torque (M) for starting the electric machine (14) is determined (42) on the basis of the estimated total amount of energy (50) and the estimated time (t__0), and wherein the power electronic system (10) is actuated (46) in accordance with the setpoint torque (M).

15 Claims, 4 Drawing Sheets

METHOD AND DEVICE FOR ACTUATING AN ELECTRIC MACHINE IN THE MOTOR STARTING MODE

BACKGROUND OF THE INVENTION

It is generally known to actuate electric three-phase current machines by means of a power inverter which is supplied with electrical energy by a direct current source and which converts the direct voltage into an alternating voltage by means of a multiplicity of power switches, and as a result supplies the electric machine with electrical energy or with electric current. The power switches are actuated or switched here in accordance with the electrical frequency of the machine, and therefore in accordance with the rotational speed. In the starting mode of the electric machine, large currents usually flow through the actuated phase sections, and due to the low electrical frequency at low rotational speeds the corresponding power switches are loaded by the corresponding phase current over a relatively long time period. This high loading can damage the power switches of the power inverter, with the result that measures have to be taken to limit the loading of the power switches.

In conventional methods, when the load limit of the power switches is reached, the power is decreased in order to limit the loading of the power switches and avoid damage to the power switches. This abrupt reduction in the torque which is made available is uncomfortable and can give rise to situations which are critical for safety when the method is applied in a motor vehicle, since the desired or requested power is unexpectedly not made available. As a result of the abrupt reduction in the torque which is made available, the drive train is abruptly relieved of tension, as a result of which oscillations which additionally have a very adverse effect on the driving comfort can occur in the drive train.

SUMMARY OF THE INVENTION

The present invention relates to a method for actuating an electric machine in the motor starting mode by means of a power electronic system, in particular for application in a motor vehicle, wherein the power electronic system has a multiplicity of controllable power switches which are designed to supply the electric machine by means of electric current.

The present invention further relates to a device for actuating an electric machine in the motor starting mode, in particular for use in a motor vehicle, by means of a power electronic system which has a multiplicity of controllable power switches which are designed to supply the electric machine with electric current.

Finally, the present invention relates to a motor vehicle drive train having an electric machine for making available driving power and having a device of the type described above.

According to the invention, a method is therefore made available for actuating an electric machine in the motor starting mode by means of a power electronic system, in particular for application in a motor vehicle, wherein the power electronic system has a multiplicity of controllable power switches which are designed to supply the electric machine with electric current, wherein a total amount of energy which is required to reach a predefined rotational speed and a time period for reaching the predefined rotational speed is estimated, wherein a setpoint torque for starting the electric machine is determined on the basis of the estimated total amount of energy and the estimated time, and wherein the power electronic system is actuated in accordance with the setpoint torque which is determined in this way.

In addition, according to the invention a device is therefore made available for actuating an electric machine in the motor starting mode, in particular for use in a motor vehicle, having a power electronic system which has a multiplicity of controllable power switches which are designed to supply an electric machine with electric current, and having a control unit for actuating the power electronic system, wherein the control unit is designed to carry out the method described above.

Finally, a motor vehicle drive train having an electric machine for making available driving power and having a device for actuating the electric machine of the type described above is therefore made available.

Motor starting mode is understood here to be a rotational speed range of the electric machine in which the corresponding electrical frequency of the electric machine is so low that the power switches of the power electronic system are loaded for a time period which leads to overloading of the power switches.

As a result of the fact that the time until a predefined rotational speed is reached and the required amount of energy until the predefined rotational speed is reached are estimated, a rotational speed for moving through the starting mode or the critical rotational speed range in the motor starting operation can be determined with the result that the predefined rotational speed can be reached without the load limit of the power switches being exceeded, and the critical rotational speed range can therefore be moved through completely without a reduction. In addition, as a result of the estimation of the required amount of energy for passing through the critical rotational speed range it is possible to dispense with costly integration of temperature sensors in the power switches since the amount of electrical energy which is converted in the power switches can also be determined on the basis of the estimated values.

In general, in the case of application in a motor vehicle, an abrupt reduction in the torque which is made available in the starting mode can be avoided, as a result of which both comfort and safety are improved.

It is particularly preferred here if an energy profile for a continuous profile of the setpoint torque for the estimated time period is determined.

As a result, a particularly comfortable starting mode can be achieved without jumps in torque.

It is also preferred if the power loss of the power electronic system for the estimated time period is estimated and the energy profile is determined on the basis of the power loss.

As a result, it is possible to dispense with costly temperature sensors in the power electronic system for determining the power loss.

It is also preferred if a mechanical load of the electric machine is determined and the required total amount of energy and/or the time period are/is estimated on the basis of the specific load.

As a result, the estimated values are particularly precise since they are adapted to the respective situation.

It is particularly preferred here if in the case of application in a motor vehicle the load is determined on the basis of a positive gradient of the section of a route, an obstacle, a starting movement of the motor vehicle, a coefficient of friction of the underlying surface and/or a vehicle weight.

As a result, the main influencing variables of the estimated starting parameters can be detected and the estimated values can be determined particularly precisely.

It is particularly preferred if a maximum permissible torque is determined on the basis of the estimated total amount of energy, the time period and the power loss of the power electronic system.

As a result, a maximum torque can be determined and made available individually without the power electronic system and/or the electric machine being overloaded.

It is particularly advantageous if the maximum permissible torque is compared with a requested torque for driving the electric machine, and the setpoint torque is set in accordance with the lower of the two torques.

As a result, either a torque corresponding to the driver's request or a maximum permissible torque can be made available.

It is also preferred if a maximum permissible phase current of the electric machine is determined on the basis of a maximum permissible electric current of the power electronic system as a function of the rotational speed of the electric machine.

As a result, overloading of the power switches, and associated damage thereto, can be avoided.

It is particularly preferred here if a power reserve of the electric machine is determined on the basis of a difference between an estimated phase current of the electric machine for the estimated time period and the maximum permissible phase current.

According to requirements, it is therefore possible to make available an additional torque, insofar as the power electronic system and/or the electric machine are/is not operated at the power limit for the estimated starting mode.

Of course, the features and properties of the method according to the invention can also be applied to the device according to the invention and/or relate to the device according to the invention.

DETAILED DESCRIPTION

Figure 1:
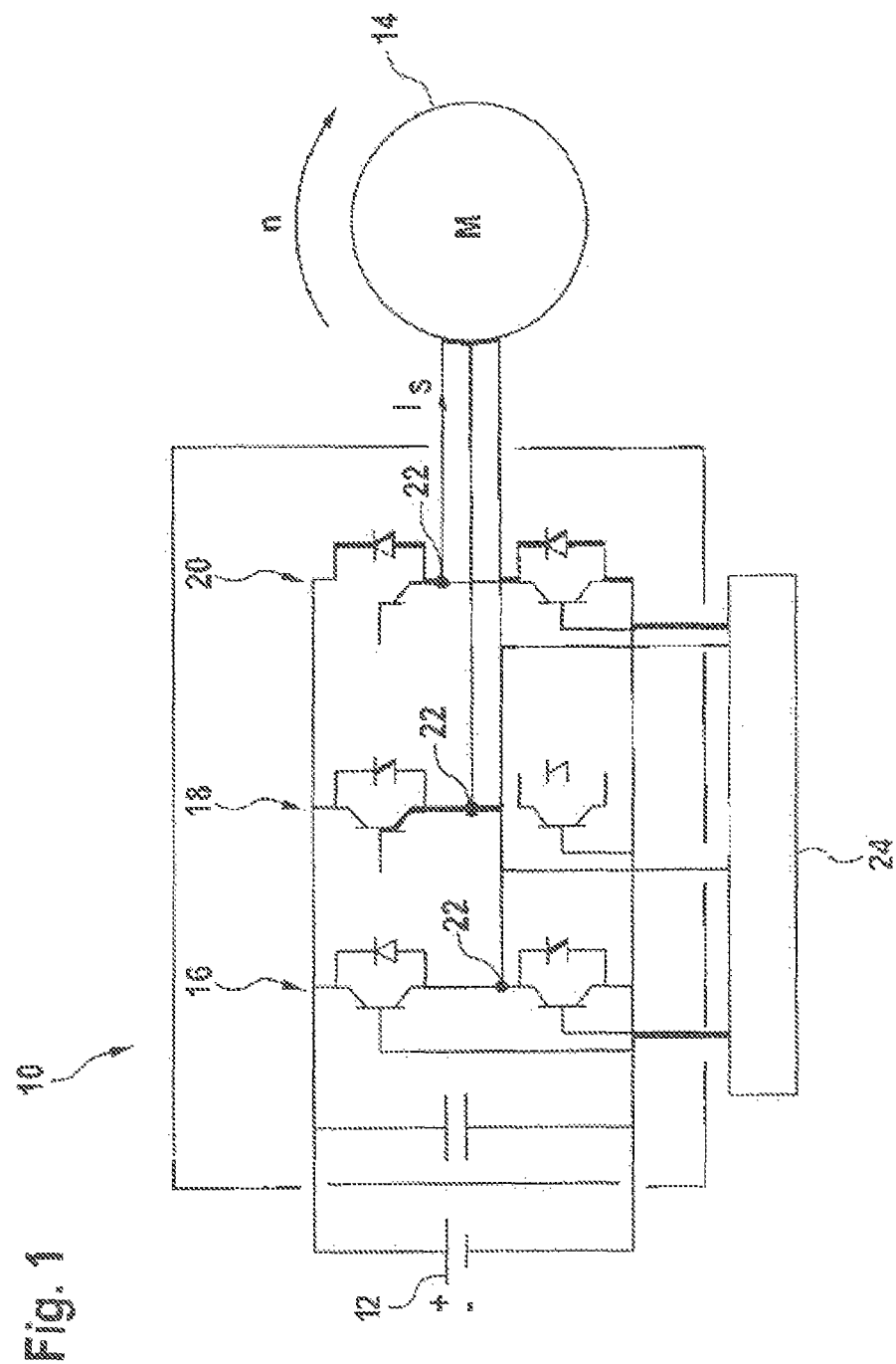
FIG. 1 shows a schematic view of a power inverter for driving an electric three-phase current machine.

A power inverter for actuating an electric machine is illustrated schematically in FIG. 1 and is denoted generally by 10.

The power inverter 10 is connected to a direct voltage source 12 and serves to energize an electric three-phase current machine 14 in three phases. The electric machine 14 rotates correspondingly at a rotational speed n. The power inverter 10 has three half bridges 16, 18, 20 which are connected parallel to the direct voltage source 12 and each has two switches. A half bridge tap 22 is formed in each case between the switches and is respectively connected to a phase line of the electric machine 14.

In each case an actuation voltage is applied between the phase lines by alternately opening and closing the switches, with the result that a phase current is correspondingly set in each case, said phase current being generally denoted here as 1_s and driving the electric machine 14.

The power inverter 10 is preferably embodied by means of the semiconductor switches, wherein in each case a free-wheeling diode is usually connected parallel to the semiconductor switches. The semiconductor switches are preferably embodied as IGBTs.

The switches of the power inverter 10 are actuated by means of a control unit 24 which is only illustrated schematically here, and are correspondingly alternately opened and closed in order to provide the phase voltage and correspondingly the phase current 1_s with a specific profile, and to energize the electric machine 14 with the phase current 1_s.

Figure 2:
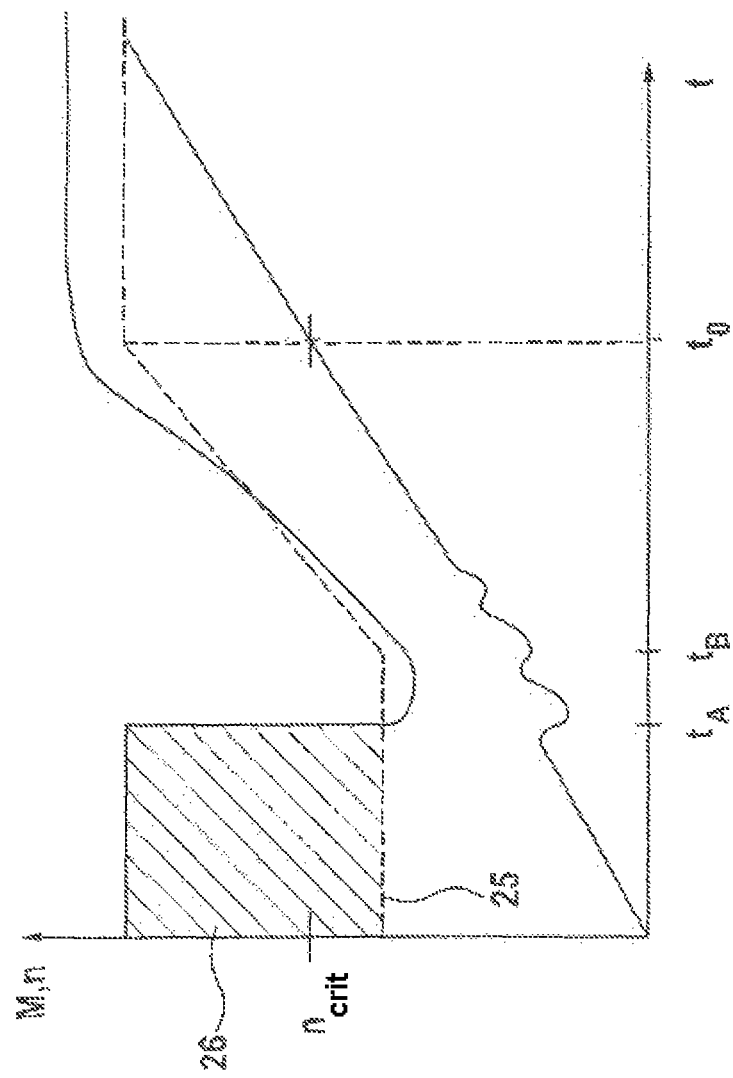
FIG. 2 shows, in schematic form, a torque profile and a rotational speed profile of an electric machine in the starting mode according to the prior art.

FIG. 2 is a schematic illustration of a torque profile and rotational speed profile in the starting mode of an electric machine, plotted as a function of the time. The starting mode is here a range up to a time t_0 at which a critical rotational speed n_crit is reached. The critical rotational speed n_crit is the rotational speed at which the electrical frequency of the electric machine 14 is so high that individual loading of an individual power switch of the power inverter 10 is so short that the average thermal loading of the respective switch is low. The starting mode of the electric machine 14 accordingly forms the range up to the time t_0.

In the diagram in FIG. 2, the torque M which is made available, the rotational speed n and the maximum permissible power loss 25 are illustrated as a function of the time. The converted energy is here the area which is formed between the torque M and the permissible power loss 25. At first, a constant torque M is made available until a maximum permissible energy loss is reached. This maximum permissible energy loss is illustrated in a hatched form in FIG. 2 and is denoted generally by 26. When the maximum permissible energy loss is reached, according to the known method the torque is abruptly reduced, as is shown at t_A.

The profile of rotational speed correspondingly increases linearly at the constant rotational speed M. At the time t_A, the rotational speed decreases abruptly as a result of the reduction in the torque and does not increase again until the torque M is increased again. The maximum permissible power loss 25 is dependent on the rotational speed n and increases linearly starting from a predefined rotational speed of a time t_B, up to the time t_0 at which the critical rotational speed n_crit is reached. The maximum permissible power loss 25 is correspondingly higher for relatively high rotational speeds n since at these rotational speeds n the power switches only have to briefly bear the phase current 1_s and the average thermal load of the switches is therefore low. Since the maximum permissible power loss 25 increases starting from the time t_B, a correspondingly rising torque M can also be made available, with the result that the rotational speed n increases further until the critical rotational speed n_crit is reached. As a result of the abrupt reduction of the torque M at the time t_A, uncomfortable oscillations can occur in the drive train. These oscillations are indicated in FIG. 2 by the fluctuating rotational speed n in this region.

Figure 3:
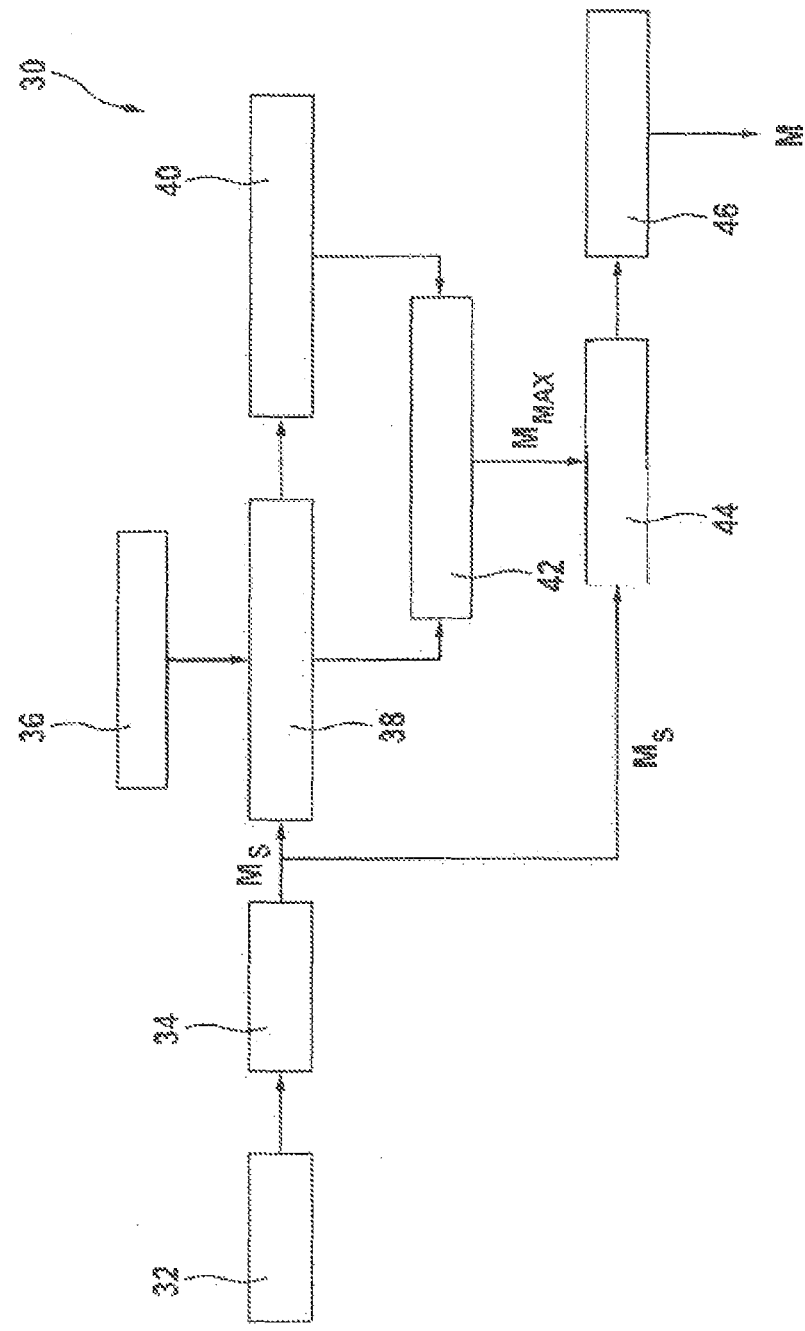
FIG. 3 shows, in schematic form, a flow chart of the method according to the invention for determining a setpoint torque for the electric machine in the starting mode.

FIG. 3 illustrates schematically a flow chart explaining the method according to the invention and is generally denoted by 30. The method 30 is directed for example to a motor vehicle with an electric drive and starts with a driver's request for starting the motor vehicle, as is shown at 32. This driver's request can be detected and/or initiated by, for example, the activation of a gas pedal. At 34, a torque setpoint value M_s for the electric machine 14 is calculated from the driver's request which is obtained in this way. In addition, at 36, vehicle state variables are acquired in order to determine a corresponding starting characteristic. Such state variables are, for example, the inclination of the section of route. Obstacles such as, for example, a curb, a present coasting speed of the vehicle in the forward direction or the rearward direction, the mass of the vehicle as a result of different loading, a coefficient of friction of the underlying surface. At 38, a required amount of energy and the time t_0 for the critical rotational speed n_crit to be reached is estimated for the starting process from the vehicle state variables and the torque setpoint value M_s. Losses in the power switches for the starting process until the time t_0 is reached are estimated from these estimated values, as is shown at 40. A distribution of the drive energy for the starting process up to the time t_0 and a corresponding torque profile for the starting process up to the time t_0 or the critical rotational speed n_crit are calculated on the basis of the estimated values for the required energy and the time t_0 or the time period for the starting mode of the electric machine 14, which were estimated at 38, and the estimated losses in the power switches, which were estimated at 40, an energy, as is shown at 42. As a result, a profile of a maximum permissible torque M_max is determined. At 44, the maximum permissible torque M_max and the setpoint torque M_s are compared, and the correspondingly lower value is selected, as is shown at 44. From the comparison of the maximum permissible torque and of the torque setpoint value M_s, a setpoint torque M for driving the electric machine 14 is determined, as is shown at 46. Correspondingly, the electric machine 14 is actuated or energized by means of the power inverter 10, in order therefore to make available the setpoint torque M.

As a result of the fact that the required energy for the critical rotational speed n_crit to be reached and the time period t_0 for the critical rotational speed n_crit to be reached are estimated on the basis of the vehicle state variables, a torque profile for the critical rotational speed n_crit to be reached is correspondingly calculated or determined, with the result that there is no need for abrupt reduction as a result of overloading. The setpoint torque M during starting can therefore be lower than in the prior art, but as a result no abrupt reduction is necessary in order to protect the power switches against overloading.

In this context, the difference between the calculated power loss and a previously determined maximum permissible power loss is integrated over time, with the result that the energy which is available for driving the electric machine 14 can be calculated, and the available torque M can be determined therefrom.

As a result, the electric machine 14 can therefore make available a continuous torque in the starting mode without the power switches of the power inverter 10 being overloaded, and without a reduction and an associated abrupt drop in torque being necessary.

Figure 4:
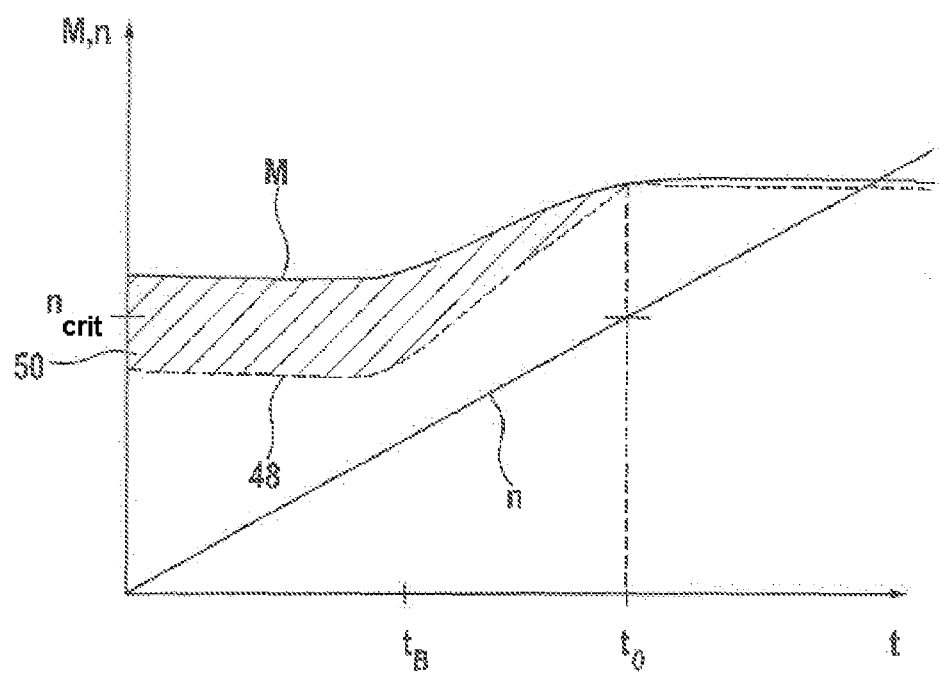
FIG. 4 shows a torque profile and a rotational speed profile of an electric machine according to the method according to the invention.

FIG. 4 illustrates schematically a torque profile M and a rotational speed n as is made available by the method according to the invention in starting mode. In this context, the profile of the maximum permissible power loss 48, which increases as the rotational speed n increases, is illustrated schematically by dashes. The calculated power loss for the starting mode results from the calculated torque profile M. The difference between the calculated and the maximum permissible power loss integrated over the time of the starting of the machine up to the time t_0 yields the available energy for driving the electric machine 14. In FIG. 4, this available energy is illustrated as a hatched area and is denoted generally by 50. The torque profile M is continuous in FIG. 4 and increases starting from a specific rotational speed at the time t_B, since at this time the maximum permissible energy also increases in accordance with the relatively high electrical frequency of the electric machine 14. Starting from the time t_0, the torque M which is made available corresponds to the maximum permissible power loss. For the starting mode up to the time t_0, the required energy can therefore be determined and a corresponding torque profile M for the critical rotational speed n_crit to be reached can be determined. As a result of this estimation there is no need for a reduction in the torque M, as a result of which a linearly increasing rotational speed n is reached up to the time t_0. The critical rotational speed n_crit is dependent on the properties (for example pole number) of the electric machine 14 and can be, for example, 300 rpm.

Figure 5:
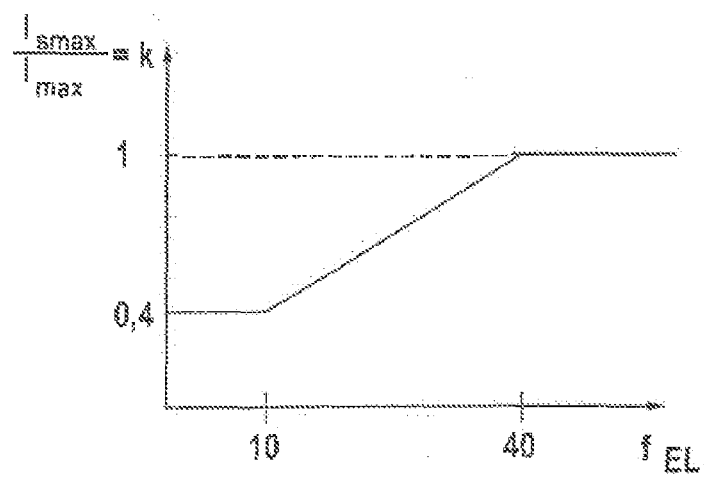
FIG. 5 shows the profile of a phase current as a function of the electrical frequency of a three-phase current machine.

In FIG. 5, the maximum permissible phase current l_s is illustrated, which phase current l_s is standardized to the maximum permissible current l_max of the power inverter 10 and correspondingly forms the factor k. The maximum permissible phase current l_s is illustrated in FIG. 5 as a function of the electrical frequency f_EL of the electric machine 14. For an electrical frequency f_EL below 10, the maximum permissible phase current is approximately 0.4 of the maximum permissible power inverter current. Starting from an electrical frequency of 40, the maximum permissible phase current l_s is equal to the maximum permissible current l_max of the power switches. Between the electrical frequency 10 and the electrical frequency 40, the maximum permissible phase current l_s increases linearly since as the electrical frequency f_EL increases the duration of the loading of the power switches is lower and the thermal loading is therefore reduced.

The maximum energy which can be converted by means of the semiconductor without the power limit which is formed in this way being exceeded is correspondingly:

$$E\_EM = w(t) * 3 * pP * \text{phi} * k * l\_s(t\_0 - t\_\text{Start}),$$

where w is the angular speed of the electric machine 14, pP is the pole number pair of the electric machine 14 and phi is the magnetic flux.

According to the prior art, no further energy for starting the electric machine 14 is available or permissible by means of this energy E_EM. When this energy is reached, according to the prior art, the torque M is correspondingly reduced, as is illustrated in FIG. 2.

Since according to the invention the time t_0 and the required energy 50 are estimated and distributed uniformly over the time up to t_0, an additional phase current l_Diff can be determined, which phase current l_Diff can be used to increase the power during the starting of the electric machine 14. As a result, a power reserve can be correspondingly determined.

The additional energy is obtained from:

$$E\_\text{res} = w(t) * 3pP * \text{phi} * l\_\text{Diff}(t) * (t\_0 - t\_\text{start}).$$

where $l\_\text{Diff} = l\_s - (k * l\_\text{smax})$

This additional energy can be used during the starting of the electric machine 14. The total energy for starting the electric machine 14 is obtained from:

$$E\_EM + E\_\text{res} = P\_\text{total}$$

The energy distribution for the starting process up to the time t_0 is determined on the basis of the required energy for the starting process, the possible energy corresponding to E_EM and the additional energy E_res, which can be distributed when required.

The control unit 24 distributes the power correspondingly in such a way that in the case of a large power demand the energy E_EM has such a profile that the starting process is continuous and comfortable.

The invention claimed is:

1. A method (30) for actuating an electric machine (14) in the motor starting mode by a power electronic system (10) having a multiplicity of controllable power switches which are designed to supply the electric machine (14) with electric current (l_s), the method comprising:
   estimating (38), by a controller, a total amount of energy (50) which is required to reach a predefined rotational speed (n_crit) and a time period (t_0) for reaching the predefined rotational speed (n_crit);
   determining (42), by the controller, a setpoint torque (M) for starting the electric machine (14) on the basis of the estimated total amount of energy (50) and the estimated time (t_0) such that a maximum permissible energy loss is not reached prior to the electric machine (14) reaching the predefined rotational speed (n_crit); and
   actuating (46), by the controller, the power electronic system (10) in accordance with the lesser of a maximum permissible torque M max and the setpoint torque (M).

2. The method according to claim 1, further comprising determining (38) an energy profile for a continuous profile of the setpoint torque (M) for the estimated time period.

3. The method according to claim 1, further comprising estimating (40) a power loss of the power electronic system (10) for the estimated time period (t_0), and determining (42) the energy profile on the basis of the power loss.

4. The method according to claim 1, further comprising determining a mechanical load of the electric machine (14), and estimating (38) the required total amount of energy (50) and the time period (t_0) on the basis of the specific load.

5. The method according to claim 4, further comprising providing the electric machine (14) for driving a motor vehicle, and determining (36) the load on the basis of one or more parameters.

6. The method according to claim 1, further comprising determining (42) a maximum permissible torque (M_max) on the basis of the estimated total amount of energy (50), the time period (t_0) and the power loss of the power electronic system (10).

7. The method according to claim 6, further comprising comparing the maximum permissible torque (M_max) with a requested torque (M_s) for driving the electric machine (14), and setting the setpoint torque (M) in accordance with the lower of the two torques (M_max, M_s).

8. The method according to claim 1, further comprising determining a maximum permissible phase current of the electric machine (14) on the basis of a maximum permissible electric current (l_max) of the power electronic system (10) as a function of the rotational speed (n) of the electric machine (14).

9. The method according to claim 8, further comprising determining a power reserve (e-res) of the electric machine (14) on the basis of a difference between an estimated phase current of the electric machine (14) for the estimated time period (t_0) and the maximum permissible phase current.

10. A device (10) for actuating an electric machine (14) in the starting mode having a power electronic system (10) which has a multiplicity of controllable power switches which are designed to supply an electric machine (14) with electric current (l_s), and having a control unit (24) for actuating the power electronic system (10), wherein the control unit (24) is designed to carry out the method according to claim 1.

11. A motor vehicle drive train having an electric machine (14) for making available driving power and having a device (10) for actuating the electric machine (14) according to claim 10.

12. The method according to claim 1, further comprising applying the electric machine (14) in a motor vehicle.

13. The method according to claim 1, further comprising determining a mechanical load of the electric machine (14), and estimating (38) the required total amount of energy (50) on the basis of the specific load.

14. The method according to claim 1, further comprising determining a mechanical load of the electric machine (14), and estimating (38) the time period (t_0) on the basis of the specific load.

15. The method according to claim 5, wherein the one or more parameters includes at least one of a positive gradient of the section of a route, an obstacle, a starting movement of the motor vehicle, a coefficient of friction of the underlying surface and a vehicle weight.

* * * * *